(12) United States Patent
Pan et al.

(10) Patent No.: US 9,832,107 B2
(45) Date of Patent: Nov. 28, 2017

(54) MISCONNECTION AVOIDANCE ON NETWORKS

(75) Inventors: Ping Pan, San Jose, CA (US); Rajan Rao, Santa Clara, CA (US); Biao Lu, Saratoga, CA (US)

(73) Assignee: Infinera Corporation, Sunnyvale, CA (US)

( * ) Notice: Subject to any disclaimer, the term of this patent is extended or adjusted under 35 U.S.C. 154(b) by 378 days.

(21) Appl. No.: 12/897,608

(22) Filed: Oct. 4, 2010

(65) Prior Publication Data

US 2011/0305450 A1    Dec. 15, 2011

Related U.S. Application Data

(60) Provisional application No. 61/353,451, filed on Jun. 10, 2010.

(51) Int. Cl.
| | |
|---|---|
| *H04L 12/28* | (2006.01) |
| *G01R 31/08* | (2006.01) |
| *H04J 3/00* | (2006.01) |
| *H04B 7/212* | (2006.01) |
| *H04L 12/703* | (2013.01) |
| *H04L 12/24* | (2006.01) |

(52) U.S. Cl.
CPC .......... *H04L 45/28* (2013.01); *H04L 41/0663* (2013.01)

(58) Field of Classification Search
CPC .... H04L 45/28; H04L 41/0663; H04L 12/433
USPC ....................................................... 370/216
See application file for complete search history.

(56) References Cited

U.S. PATENT DOCUMENTS

| | | | | |
|---|---|---|---|---|
| 7,733,788 B1* | 6/2010 | Michalski | ........... | H04L 63/1416 370/242 |
| 2002/0099854 A1* | 7/2002 | Jorgensen | ................. | H04L 1/20 709/249 |
| 2002/0172150 A1* | 11/2002 | Kano | ...................... | H04J 3/085 370/216 |
| 2002/0186661 A1* | 12/2002 | Santiago | ................. | H04L 47/10 370/252 |
| 2003/0026250 A1* | 2/2003 | Fang | ..................... | H04J 3/1617 370/386 |

(Continued)

*Primary Examiner* — Faruk Hamza
*Assistant Examiner* — Abu-Sayeed Haque
(74) *Attorney, Agent, or Firm* — David L. Soltz (57) ABSTRACT

A switch node provided with a switch, an input interface and an output interface. The input interface is adapted to couple to a first communication link to receive a first TDM frame having a user payload field containing a first user data from the first communication link, and a frame overhead field containing a first identification. The input interface is configured to validate the first identification in the frame overhead field and reject the first TDM frame responsive to the first identification being invalid, and to forward the first user data to the switch responsive to the first identification being valid. The output interface is adapted to couple to a second communication link. The output interface is configured to receive the first user data from the switch, and to generate a second TDM frame having a second user payload field containing the first user data, and a second frame overhead field containing a second identification that is different from the first identification. The output interface is also configured to transmit the second TDM frame onto the second communication link.

20 Claims, 7 Drawing Sheets

(56) References Cited

U.S. PATENT DOCUMENTS

| | | | |
|---|---|---|---|
| 2004/0114592 A1* | 6/2004 | Kang | H04Q 11/0067 370/389 |
| 2004/0170173 A1* | 9/2004 | Pan | H04J 3/1617 370/392 |
| 2005/0089027 A1* | 4/2005 | Colton | H04Q 11/0005 370/380 |
| 2005/0105905 A1* | 5/2005 | Ovadia | H04L 45/62 398/47 |
| 2007/0019676 A1* | 1/2007 | Kompella | H04L 45/10 370/468 |
| 2008/0170496 A1* | 7/2008 | Kano | H04L 41/0896 370/225 |
| 2008/0219669 A1* | 9/2008 | Fourcand | H04J 3/1617 398/98 |
| 2013/0044589 A1* | 2/2013 | Ceccarelli | H04L 41/0654 370/228 |

* cited by examiner

MISCONNECTION AVOIDANCE ON NETWORKS

CROSS-REFERENCE TO RELATED APPLICATIONS

The present patent application claims priority to the United States Provisional patent application identified by U.S. Ser. No. 61/353,451 filed on Jun. 10, 2010, the entire content of which is hereby incorporated herein by reference.

FIELD OF THE DISCLOSURE

The disclosure generally relates to methods and apparatuses for support of traffic protection and recovery in networks having multiple switch nodes communicating via communication links. Multiple working connections and protecting connections may share the same set of network resources of switch nodes for optimal resource utilization. The disclosure enables operators to avoid misdirection of data traffic when data traffic is redirected over a protecting connection already in use by other traffic through the use of identifications of the connections. This enables operators to avoid time delays by eliminating the need to wait for a connection acknowledgement when switching traffic to the protecting connection. Though the disclosure is in the context of a shared mesh network that is optically based, the disclosure may apply to all circuit switched networks or hybrid circuit switched/packet switched networks that utilize protection and recovery provisioning.

BACKGROUND

Two fundamentally different switching technologies are used to enable digital communications, i.e. circuit switched networks and packet switched networks. Hybrid circuit switched/packet switched networks also exist in which packets are transmitted using TDM frames.

The circuit switched network operates by establishing a dedicated connection or circuit between two or more switch nodes within the circuit switched network. The packet switched network, on the other hand, typically connects computers and establishes an asynchronous "virtual" channel between two or more nodes within the network. In a packet-switched network, a data set, such as a voice signal, is divided into small pieces called packets which are then multiplexed onto high-capacity connections for transmission. Network hardware delivers packets to specific destinations where the packets are reassembled into the original data set.

The present disclosure relates to improvements in circuit switched networks and hybrid circuit switched/packet switched networks. More particularly, one example of a circuit switched network is a public switched telephone network (PSTN) that is used for making telephone calls. For example, a telephone call causes a circuit to be established from an originating telephone through local switching offices across trunk lines, to a remote switching office and finally to the intended destination telephone. When the circuit is in place, the telephone call is guaranteed a data path for digitized or analog voice signals regardless of other network activity. Within the PSTN there existed a need to transmit multiple subscribers' calls upon the same transmission medium. To accomplish this, network designers developed and make use of a protocol referred to as time division multiplexing (TDM).

Time-division multiplexing (TDM) is a type of digital multiplexing in which two or more signals or bit streams are transferred simultaneously as sub-channels in one communication channel, but are physically taking turns on the communication channel. The time domain is divided into several recurrent timeslots of fixed length, one for each sub-channel. After the last sub-channel, the cycle starts all over again. Time-division multiplexing is commonly used for circuit mode communication with a fixed number of channels and constant bandwidth per channel. Time-division multiplexing differs from statistical multiplexing, such as packet switching, in that the timeslots are returned in a fixed order and pre-allocated to the channels, rather than scheduled on a packet by packet basis. Time-division multiplexing takes frames of user data, such as voice signals, and multiplexes them into a TDM frame.

The circuit switched network usually includes multiple switch nodes which are arranged in a topology referred to in the art as a "shared mesh network". Within the shared mesh network, user traffic can be transported between any two locations using predefined connections specifying particular links and/or switch nodes for conveying the user traffic.

The switch nodes are each provided with a control module. The control modules of the switch nodes function together to aid in the control and management of the circuit switched networks. The control modules can run a variety of protocols for conducting the control and management of the circuit switched networks. One prominent protocol is referred to in the art as "Generalized Multiprotocol Label Switching (GMPLS)". In general, Generalized Multiprotocol Label Switching includes protection and recovery mechanisms which specifies predefined (1) working connections within a shared mesh network having multiple switch nodes and communication links for transmitting data between the switch nodes; and (2) protecting connections specifying a different group of switch nodes and/or communication links for transmitting data in the event that one or more of the working connections fail. In other words, when a working connection fails, the Generalized Multiprotocol Label Switching protocol automatically activates one of the protecting connections into a working connection for redirecting data within the shared mesh network.

However, the protection and recovery mechanisms defined in GMPLS have overlooked a number of issues when scaling to large optical shared mesh networks including a problem referred to herein as "misconnection". Misconnection occurs when a single set of network resources are allocated to protect multiple user connections. When there are multiple simultaneous network failures, it is possible that some of the protecting connections will be "preempted", which is the stopping of a lower priority protecting connection in favor of a higher priority protecting connection. The pre-emption of the lower priority protecting connection may temporarily cause a misdirection of the data flowing in the circuit switched network. Misconnections can also be caused by other conditions or events, such as miscommunications between a control module and an input or output interface of a switch node, mis-configuration of a switch node, messaging errors, latency in control messages, protocol deficiencies or unavailability of resources.

Figure 1:
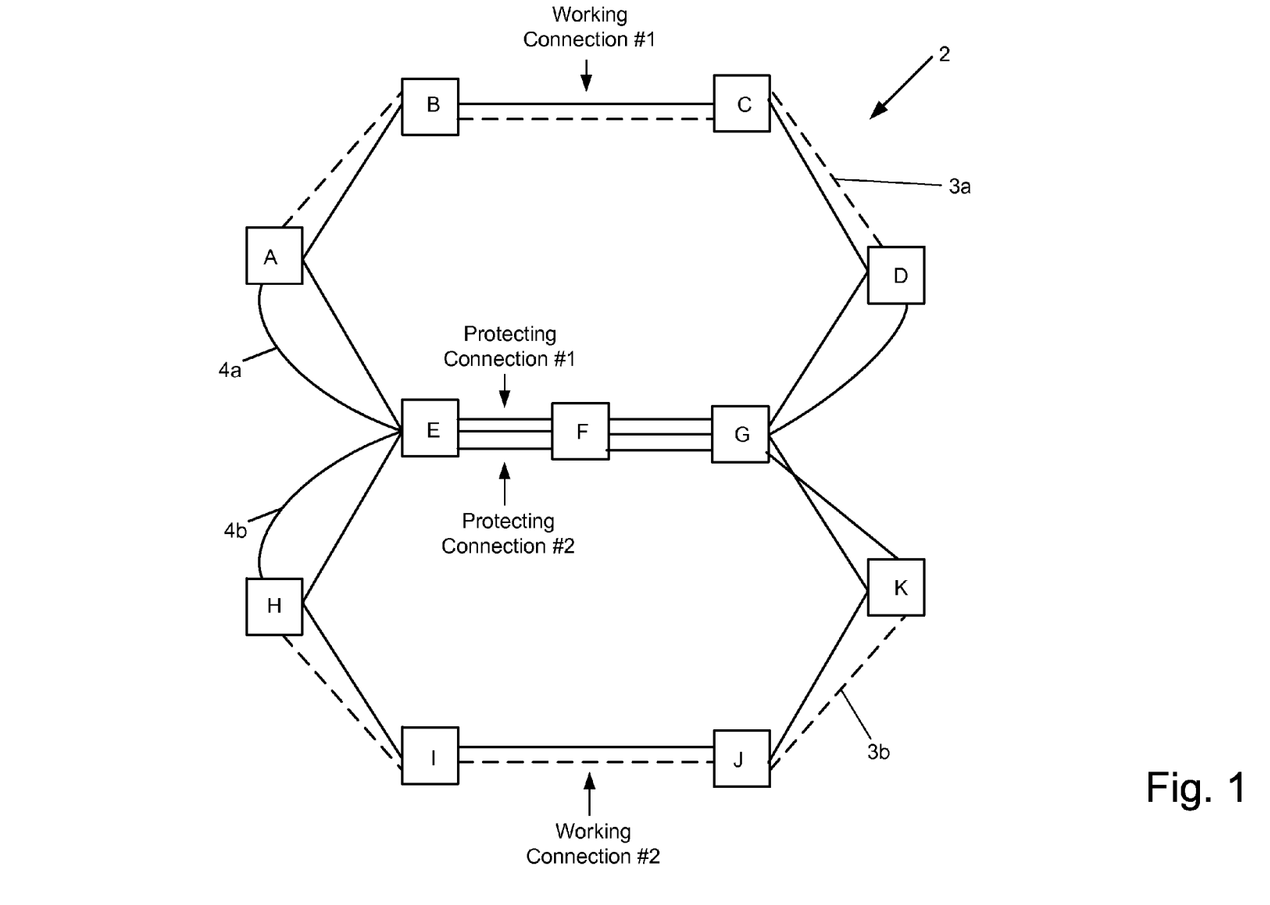
FIG. 1 is a block diagram of a prior art mesh network having multiple working connections, and two protecting connections sharing switch nodes.

For example, an exemplary mesh network 2 is shown in FIG. 1, by way of example. In FIG. 1, the mesh network 2 includes switch nodes A, B, C, D, E, F, G, H, I, J and K. In this example, the mesh network 2 includes headend switch nodes A and K; tailend switch nodes D and H; and intermediate switch nodes B, C, E, F, G, I and J. The mesh network 2 also includes two working connections which are shown by single dashed lines 3a and 3b; and two protecting connections 4a and 4b that are shown by solid lines. Thus, the working connections are formed by the switch nodes {A, B, C, D}, {K, J, I, H}; and the protecting connections are formed by the switch nodes {A, E, F, G, D}, and {K, G, F, E, H}.

In this example, the links between E, F and G are shared by both protecting connections 4a and 4b. The working connections 3a and 3b and the protecting connections 4a and 4b can be established by the switch nodes A-K using GMPLS protocols prior to any network failure.

In this example, all of the working connections 3a and 3b, and the protecting connections 4a and 4b are bi-directional. The working connections 3a and 3b, as well as the protecting connections 4a and 4b are preferably composed of time-slots, and are switched at each hop.

To illustrate the "misconnection" condition, the protecting connection 4b has a higher priority than a priority of the protection connection 4a. Initially the headend switch node A detects a network failure of the working connection 3a on a link between switch nodes B and C. The headend switch node A activates the protecting connection 4a by sending control messages to the switch nodes E, F, G and D, and then switches traffic to the protecting connection 4a. Then, a network failure on a link between switch nodes I and J, triggers the headend switch node K to activate the protecting connection 4b, which has a higher priority than the protecting connection 4a. The headend switch node K activates the protecting connection 4b by sending control messages to the switch nodes G, F, E and H, and then immediately switches traffic to the protecting connection 4b.

When the switch nodes G, F and E process the control message sent by the headend switch node K, the protecting connection 4b will preempt the protecting connection 4a. However, due to latency and processing delays it is possible for the traffic to reach the switch nodes E, F and G prior to the processing of the control messages preempting the protecting connection 4a. Consequently, traffic intended for tailend switch node H may be directed to the headend switch node A.

The common solution within circuit switched networks is for the headend and tailend switch nodes to wait for an explicit acknowledgement from all of the switch nodes within the protecting connection before switching user traffic. This is called end-to-end acknowledgment. In this example, headend switch node K would wait until it receives an acknowledgement from the switch nodes G, F E and H before the headend switch node K switched traffic onto the protecting connection 4b. However, this may result in an unacceptable protection delay in long-haul optical networks.

Thus there is a need to eliminate the problems associated with a misconnection while avoiding an unacceptable protection delay in circuit switched networks. The present disclosure enables network operators to activate protecting connections immediately after detecting a network failure without misconnections.

SUMMARY OF THE DISCLOSURE

This disclosure defines a new system and method to avoid misconnection issues in a network such as circuit switched networks and hybrid circuit switched/packet switched networks. Certain aspects of the disclosure include the use of identification for each user connection to ensure that data packets do not reach an unintended destination. The identification for the connections may be unique throughout the network or between each hop. The solution implements coordination between the transport layer and the control/management layer. As a result, the connection switch-over time delay is avoided and protecting connections can be activated more quickly. The disclosure benefits the design and development of rapid traffic protection and recovery applications.

In one aspect, the present disclosure describes a network. The network is provided with a first communication link, a second communication link, a first switch node and a second switch node. The first switch node has a first input interface coupled to the first communication link, and an output interface coupled to the second communication link. The first input interface receives a first TDM frame having a first user payload field including a first user data and a frame overhead field including a first identification from the first communication link. The first input interface is configured to validate the first identification and reject the first TDM frame responsive to the first identification being invalid, and pass the first user data to the output interface responsive to the first identification being valid. The output interface receives the first user data and generates a second TDM frame having a second user payload field including the first user data, and a second frame overhead field including a second identification with the second identification being different from the first identification. The second switch node has a second input interface coupled to the second communication link and receives the second TDM frame. The input interface of the second switch node is configured to validate the second identification and reject the second TDM frame responsive to the second identification being invalid.

In a version of the present disclosure, the first and second switched nodes can be configured to communicate in a connection based optical network such as a circuit switched network and/or a hybrid circuit switched/packet switched network. The first and second communication links can be optical links.

In another version of the present disclosure, the second input interface can be configured to reject the second TDM frame when the second identification does not match a third identification. The input interface of the second switch node can be an ingress line module and the output interface of the first switch node can be an egress line module.

In yet another version, the first and second identifications identify reserved time slots of a particular connection defined by the first and second communication links and the first and second switch nodes.

In another version, the first and second switch nodes communicate using time division multiplexing protocols defining reserved wavelengths, and wherein the first identification identifies one or more reserved timeslots. In this version, the first input interface can be configured to validate the first identification by comparing the first identification to information indicative of one or more reserved time slots and reject the first TDM frame responsive to a mismatch. The first identification can be implemented in a variety of manners. For example, the first identification may include an MPLS label.

In yet another version, the first switch node outputs a notification responsive to the first identification being invalid.

In another aspect, the disclosure describes a method in which circuitry of an input interface of a switch node of a network receives a TDM frame containing identification in a frame overhead field of the TDM frame from a first connection. The first connection is a first path in the network. The circuitry of the input interface determines whether the identification is indicative of predetermined reserved timeslots. The TDM frame is rejected at the input interface of the switch node responsive to the first identification contained in the frame overhead field not matching the predetermined reserved timeslots.

The network can be a connection based optical network, and the first identification may include an MPLS label.

In another version, the present disclosure describes a switch node including a switch, an input interface, and an output interface. The input interface is adapted to be coupled to a first communication link to receive a first TDM frame having a user payload field containing a first user data from the first communication link, and a frame overhead field containing a first identification. The input interface is configured to validate the first identification in the frame overhead field and reject the first TDM frame responsive to the first identification being invalid, and to forward the first user data to the switch responsive to the first identification being valid. The output interface is adapted to couple to a second communication link. The output interface is configured to receive the first user data from the switch, and generate a second TDM frame having a second user payload field containing the first user data, and a second frame overhead field containing a second identification that is different from the first identification, and configured to transmit the second TDM frame onto the second communication link.

In various aspects, the first identification may identify resources of a first connection, and the input interface of the switch node may determine that the first identification is invalid responsive to the resources identified by the first identification being configured as part of a second connection. The resources may include one or more reserved time slots.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

Definitions

If used throughout the description and the drawings, the following short terms have the following meanings unless otherwise stated:

APS stands for Automatic Protection Switching Technology.

DCC stands for Dedicated Data Communication Channels.

GCC stands for General Communication Channel which is an in-band side channel used to carry transmission management and signaling information within Optical Transport Network elements.

GACH stands for Generic Associated Channel Header.

GMPLS stands for Generalized Multi-Protocol Label Switching which extends Multi-Protocol Label Switching to encompass time-division (for example, SONET/SDH, PDH, G709), wavelength (lambdas), and spatial multiplexing (e.g., incoming port or fiber to outgoing port or fiber). GMPLS is a set of routing protocols which runs on a control module. The Generalized Multiprotocol Label Switching architecture is defined, for example in RFC 3945.

IETF stands for Internet Engineering Task Force.

IP stands for Internet Protocol which is a protocol used for communicating data across a packet-switched internetwork using the Internet Protocol Suite, also referred to as TCP/IP.

LSP stands for Label Switched Path which is a path through a Multi-Protocol Label Switching network. Note that Label Switched Paths are unidirectional; LSPs enable packets to be label switched through the Multiprotocol Label Switched network from one endpoint to another. Since bidirectional communication is typically desired, a Label Switched Path is typically set up for each direction to compensate for the unidirectional nature of the Label Switched Path.

MPLS stands for Multi-Protocol Label Switching which is a scheme in telecommunications networks for carrying data from one switch node to the next switch node. MPLS operates at an OSI model layer that is generally considered to lie between traditional definitions of layer 2 (data link layer) and layer 3 (network layer) and is thus often referred to as a layer 2.5 protocol.

OTN stands for Optical Transport Network which includes a set of optical switches which are connected by optical fiber links.

SONET/SDH stands for Synchronous Optical Networking/Synchronous Digital Hierarchy which are standardized multiplexer protocols that transfer multiple digital bit streams over optical fiber using lasers or light emitting diodes.

Rx stands for Receiver which typically refers to optical channel receivers, but can also refer to circuit receivers.

TTL stands for Time To Live and is a field in the header of a network packet (or message) that sets the number of hops through which the network packet or message travels.

Tx stands for Transmitter which typically refers to optical channel transmitters, but can also refer to circuit transmitters.

The terms SID, TID and PID refer to Slot Identification, TIM Identification and Port Identification, respectively. The terms SID, TID and PID are used to identify the system component for message delivery.

Figure 2:
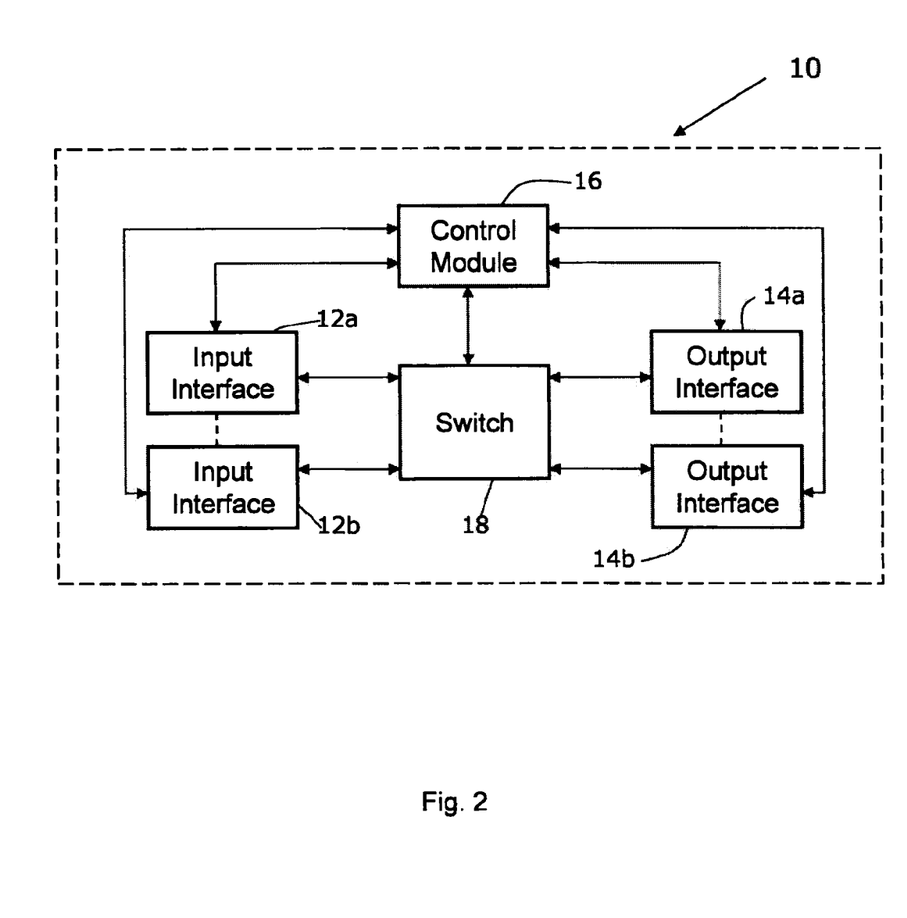
FIG. 2 is an exemplary switch node constructed in accordance with the present disclosure for communicating via a circuit switched network.
Figure 4:
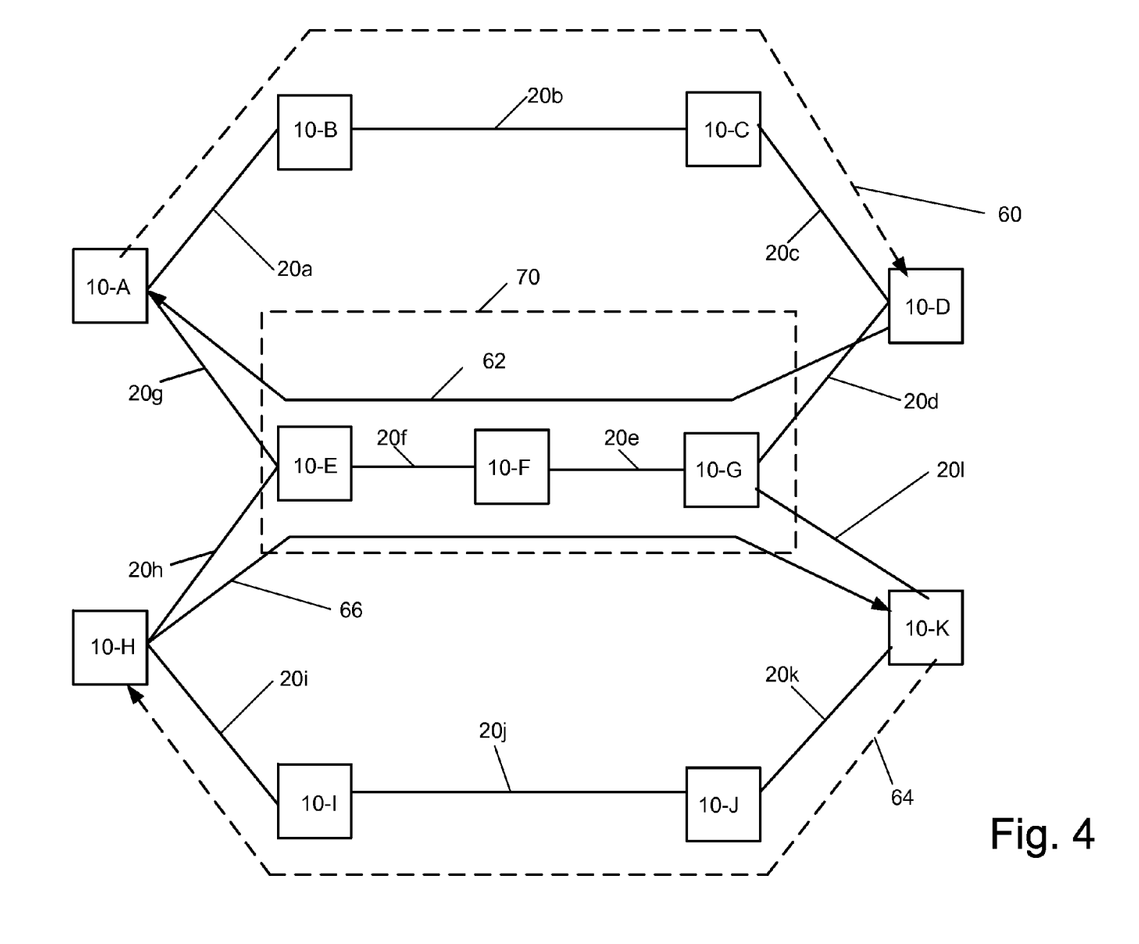
FIG. 4 is a block diagram of an exemplary network constructed in accordance with the present disclosure and having a topology that is similar to the topology of the prior art mesh network depicted in FIG. 1.

Referring now to the drawings, and in particular to FIG. 2, shown therein and designated by reference numeral 10 is an exemplary switch node constructed in accordance with the present disclosure. As will be discussed in more detail below, the switch node 10 is adapted to facilitate the communication of data (which may be referred to herein as "traffic") between multiple switch nodes 10 in a network 11 (as shown in FIG. 4). The network 11 can be an optical network such as a circuit switched network or a hybrid circuit switched/packet switched network. The switch node 10 is provided with one or more input interfaces 12, one or more output interfaces 14, a control module 16, and a switch 18.

Figure 5:
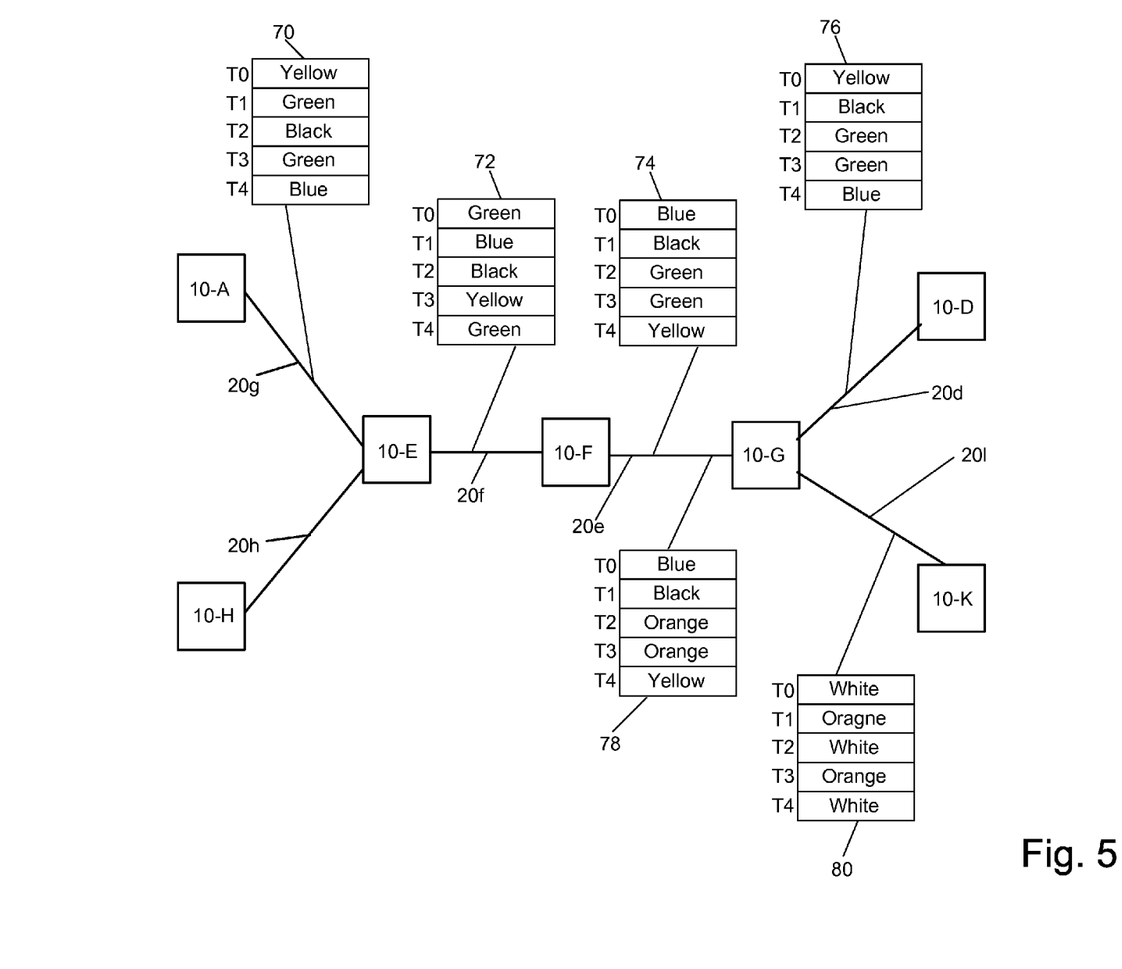
FIG. 5 is a block diagram of a portion of the network depicted in FIG. 4 illustrating rejection of misdirected data packets.
Figure 6:
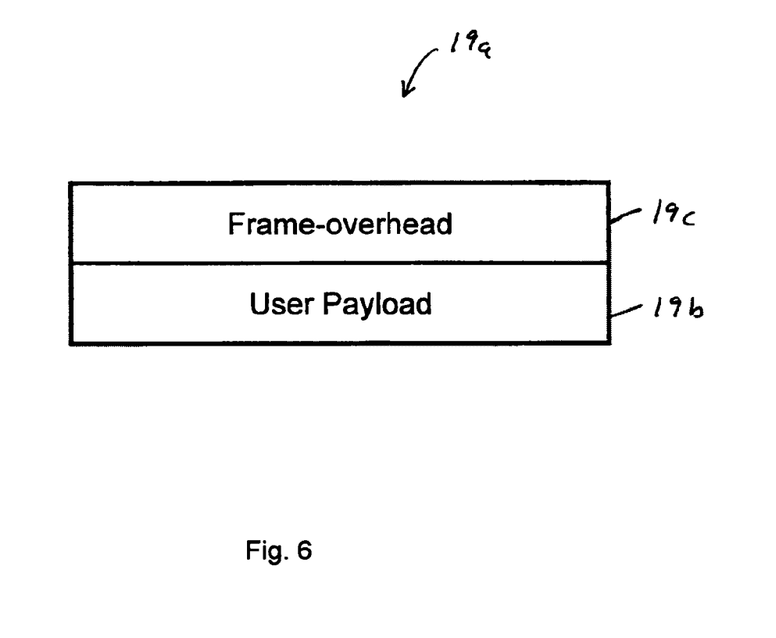
FIG. 6 is an illustration of a data frame with multiple fields.

As will be discussed in more detail below, the one or more output interfaces 14 are configured to receive a first user data and generate a TDM frame 19a (an example of which is shown in FIG. 6) having a user payload field 19b containing the first user data, and a frame overhead field 19c containing a first identification. The first user data is typically user traffic transported on the network 11. As will be discussed in more detail below with reference to FIGS. 4 and 5, the first identification preferably identifies a particular connection (for example, a working connection or a protecting connection) within the network 11. The one or more output interfaces 14 then transmit the TDM frame 19a for reception by one or more of the input interfaces 12 of another switch node 10. The one or more input interfaces 12 are configured to validate the first identification in the frame overhead field 19c and reject the TDM frame 19a responsive to the first identification being invalid. In general, responsive to rejecting the TDM frame 19a, the user traffic carried in the user payload field 19b may be replaced with a maintenance signal (e.g., an Alarm Indication Signal (AIS)) to avoid sending the user traffic to an incorrect switch node 10. Exemplary time-division multiplex networks include those identified by OTN, SONET, SDH and proprietary XTP/XTF, DTP/DTF formats.

In general, the input interfaces 12 are adapted to receive user traffic from the network 11, and the output interfaces 14 are adapted to transmit user traffic onto the network 11. The switch 18 serves to communicate the user traffic from the input interface(s) 12, to the output interface(s) 14. And, the control module 16 serves to control the operations of the input interfaces 12, the output interfaces 14, and the switch 18.

The switch node 10 can be implemented in a variety of manners, including, commercial installations having one or more backplanes (not shown), racks, and the like. In this example, the input interfaces 12, the output interfaces 14, the control module 16 and the switch 18 are typically implemented as separate devices, which may have their own power supply, local memory and processing equipment. In another example, the switch node 10 can be implemented as a single device having a shared power supply, memory and processing equipment. Or, in another example, the switch node 10 can be implemented in a modular manner in which one or more of the input interfaces 12, the output interfaces 14, the control module 16 and the switch 18 share a power supply and/or housing.

The input interfaces 12, and the output interfaces 14 of one switch node 10 are adapted to communicate with corresponding input interfaces 12 of another switch node 10 within the network 11 via communication links 20a-1, which are referred to herein generally as the communication links 20 (as shown in FIG. 4). An example of an interface is an Ethernet card or optical port. Each interface may have its own logical identification, such as an IP address.

The input interfaces 12 and the output interfaces 14 are shown separately for purposes of clarity. However, it should be understood that one or more of the input interfaces 12 and/or the output interfaces 14 could be connected to a single communication link 20 and implemented as a single device, such as a line module. The making and using of exemplary line modules are described in the patent application identified by publication no. 20090245289, the entire content of which is hereby incorporated herein by reference.

The communication links 20a-1 can be implemented in a variety of manners, such as a physical link including electrical (e.g., copper wire or coax) and/or optical signal (e.g., optical fiber or other waveguide) carrying capabilities, or as a wireless link. The implementation of the input interfaces 12, and the output interfaces 14 will depend upon the particular type of communication link 20 that the particular input interface 12 and/or output interface 14 is designed to communicate with. For example, one of the input interfaces 12 can be designed to communicate wirelessly with another switch node 10 within the network 11, while one of the output interfaces 14 of the switch node 10 can be designed to communicate optically through a fiber-optic link. For a particular switch node 10, the input interfaces 12 can be of the same type or different types; the output interfaces 14 can be of the same type or different types; and the input and output interfaces 12 and 14 can be of the same type or different types.

Figure 3:
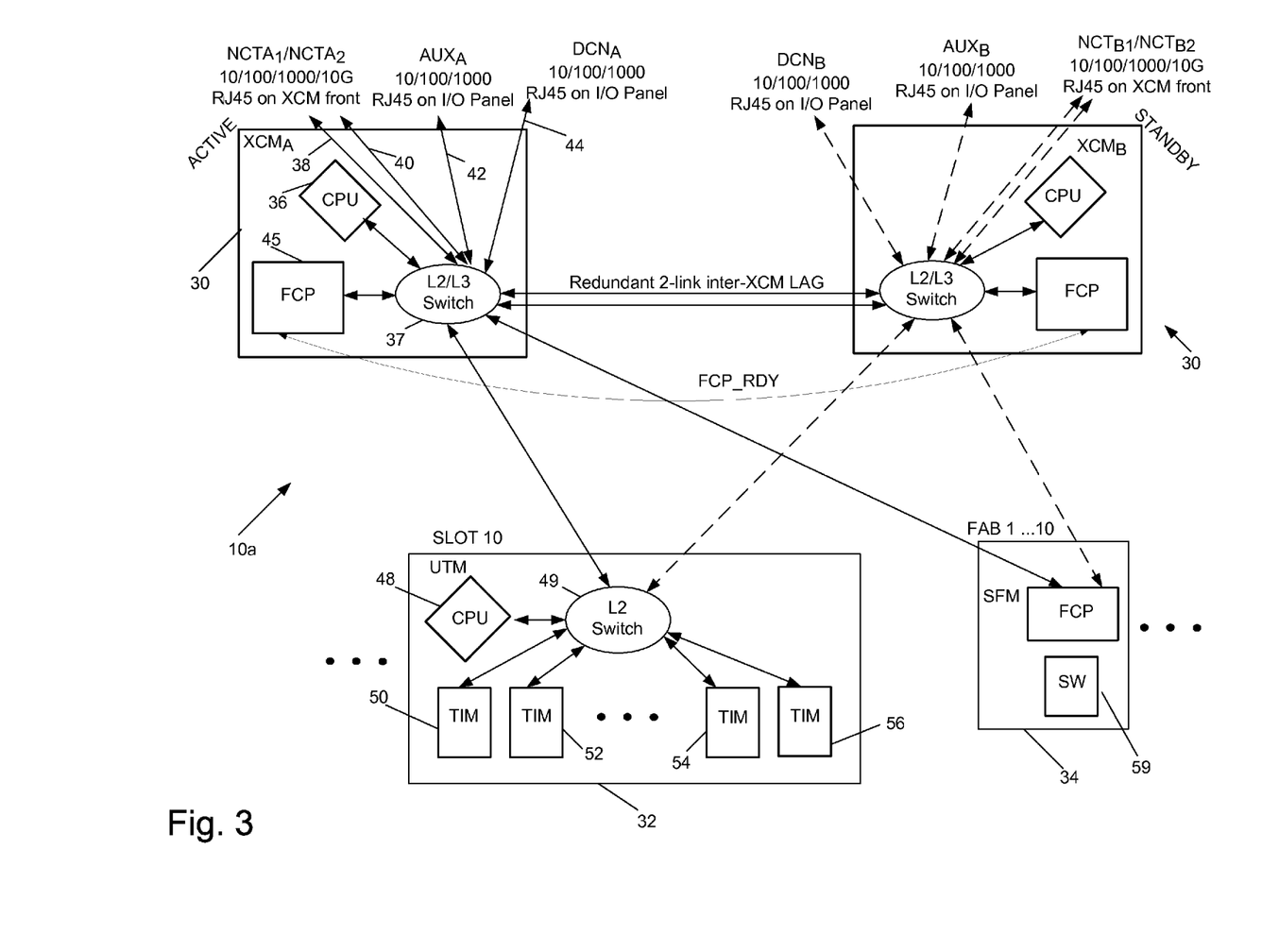
FIG. 3 is a block diagram of a particular embodiment of a switch node constructed in accordance with the present disclosure.

Referring now to FIG. 3, shown therein is a particular embodiment of a switch node 10a where such switch node 10 is implemented in a modular manner. The switch node 10a is provided with one or more exchange control modules (XCM) 30, one or more universal transport modules (UTM) 32, and one or more switch fabric modules 34. In the example depicted in FIG. 3, the switch node 10a is provided with at least two exchange control modules 30, with at least one of the exchange control modules 30 being actively used, and the other one of the exchange control modules 30 being available as a backup in the event the actively used exchange control module 30 fails or is taken off-line. In general, the exchange control modules 30 are particular implementations of the control module 16 depicted in FIG. 1; the universal transport module 32 is a particular implementation of the input interfaces 12 and the output interfaces 14; and the switch fabric module 34 is a particular implementation of the switch 18.

In general, the exchange control module 30 is provided with one or more processors 36, which is shown by way of example as a CPU. However, it should be understood that the processors 36 can be implemented in other manners such as field programmable gate array(s) (FPGA), digital signal processor(s), or the like. The exchange control module(s) 30 are also provided with a L2/L3 switch 37 (i.e. Layer 2/Layer 3 switch) that switches control messages between the exchange control module 30 and the L2 switch of the universal transport module (UTM) 32. The exchange control module(s) 30 are also provided with one or more input/output interfaces which are shown by way of example as the arrows 38, 40, 42, and 44, for communicating control messages with exchange control module(s) 30 of the switch nodes 10a in the network 11.

The universal transport module 32 is provided with one or more processors 48; one or more L2 switch 49; and one or more transport interface modules 50, 52, 54, and 56 communicating with the L2 switch 49. The L2 switch 49 also communicates with the control plane L2/L3 switch 37. The one or more processors 48 is shown by way of example as a CPU; however, it should be understood that the one or more processors 48 can be implemented in other manners such as a field programmable gate array(s) (FPGA), digital signal processor(s), or the like. Certain ones of the transport interface modules 50, 52, 54 and 56 form input interfaces (also referred to herein as an ingress line module), and other ones of the transport interface modules 50, 52, 54 and 56 form output interfaces (also referred to herein as an egress line module). For example, the transport interface modules 50 and 52 can form input interfaces, and the transport interface modules 54 and 56 can form output interfaces.

The switch fabric module 34 is provided with one or more switches 59, and functions to switch data between modules 50, 52, 54 and 56 of the universal transport module 32.

The switch fabric module 34 may include hardware components, or a combination of hardware and software components, that may provide switching functions to transfer data between the transport interface modules 50, 52, 54 and 56. In one implementation, the switch fabric module 34 may provide fully non-blocking transfer of data. The switch fabric module 34 may be programmed to transfer data from a particular transport interface module 50 and/or 52 functioning as an ingress line module to a particular transport interface module 54 and/or 56 functioning as an egress line module.

Exemplary components of a line module are shown and described with reference to FIG. 3 of U.S. Patent Publication No. 20090245289, which disclosure is incorporated herein by reference. Exemplary components of the switch fabric module 34 are shown and described with reference to FIG. 6 of U.S. Patent Publication 20090245289, which disclosure is also incorporated herein by reference. It should be understood that the switch nodes 10 and/or 10a can be implemented in a variety of manners including those shown and discussed in U.S. Patent Application No. 20090245289 entitled "Programmable Time Division Multiplexed Switching" the entire content of which is hereby incorporated herein by reference.

Referring now to FIG. 4, shown therein is the network 11 formed of multiple switch nodes 10-A, 10-B, 10-C, 10-D, 10-E, 10-F, 10-G, 10-H, 10-I, 10-J, and 10-K in accordance with the present disclosure. The network 11 can include more than eleven switch nodes and eleven are shown for purposes of clarity. In particular, the switch nodes 10-A, 10-B, 10-C and 10-D are configured to communicate via a working connection 60 along the communication links 20a, 20b, and 20c; while the switch nodes 10-A, 10-E, 10-F, 10-G and 10-D are configured to communicate via a protecting connection 62 via the communication links 20g, 20f, 20e and 20d. The switch nodes 10-K, 10-J, 10-I and 10-H are configured to communicate via a working connection 64 along the communication links 20k, 20j, and 20i; while the switch nodes 10-K, 10-G, 10-F, 10-E and 10-H are configured to communicate via a protecting connection 66 via the communication links 20l, 20e, 20f and 20g.

For bidirectional communication, for example, an optical link or fiber (commonly referred to as a "working connection") may be dedicated for data traffic transmitted in one direction, another optical link (also commonly referred to as a "working connection") may be dedicated for data traffic transmitted in the opposite direction, and yet another optical link (commonly referred to as a "protecting connection") may be used in case of a failure on a working connection. In practice, there may be N working connections and M protecting connections between any two of the switch nodes 10-1, 10-2, and 10-3, where M<N.

The switch nodes 10-A, 10-B, 10-C, 10-D, 10-E, 10-F, 10-G, 10-H, 10-I, 10-J, and 10-K are preferably adapted to setup and maintain connections through GMPLS routing and signaling protocols. Wakeup messages for activating the protecting connections 62 and 66 can be generated and provided to the relevant switch nodes 10-A, 10-B, 10-C, 10-D, 10-E, 10-F, 10-G, 10-H, 10-I, 10-J, and 10-K using GMPLS routing and signaling protocols generated and processed by the exchange control module 30 of the switch nodes 10-A, 10-B, 10-C, 10-D, 10-E, 10-F, 10-G, 10-H, 10-I, 10-J, and 10-K and transmitted via communication links other than the communication links 20a-1. Alternatively, wakeup messages for activating the protecting connections 62 and 64 can be generated, processed and transmitted by the input interface(s) 12 and/or the output interface(s) 14 of the switch nodes 10-A, 10-B, 10-C, 10-D, 10-E, 10-F, 10-G, 10-H, 10-I, 10-J, and 10-K using in-band communication, i.e., the communication links 20a-1 for activating the protecting connections 62 and/or 66.

The switch nodes 10-A, 10-B, 10-C, 10-D, 10-E, 10-F, 10-G, 10-H, 10-I, 10-J, and 10-K may also be configured with FCPs (Fast Control Planes) which is specially designed logic to handle link alarms indicative of failure of a working connection and generate wakeup messages to activate protecting connections with high efficiency in accordance with the presently disclosed and claimed inventive concepts. Methodologies for activating the switch nodes 10-A, 10-B, 10-C, 10-D, 10-E, 10-F, 10-G, 10-H, 10-I, 10-J, and 10-K using in-band or out-band signaling are disclosed in U.S. patent application 61/353,438 filed on Jun. 10, 2010, the content of which is hereby incorporated herein by reference.

By way of example, the input interfaces 12, and/or the output interfaces 14, and/or the universal transport module 32 will be described hereinafter as line modules for purposes of clarity.

To implement shared-mesh restoration, each line module needs to keep track of the connections and associated network resources (e.g. time slots in a time-division multiplexing switching). Upon the reception of activation messages from in-band channels, the line modules can identify the protecting connections, and activate them accordingly.

Throughout the remainder of this description, the operation of the switch nodes 10 and/or 10a to form the network 11 depicted in FIG. 4 will be described. In this example, the network 11 includes headend switch nodes 10-A and 10-K; tailend switch nodes 10-D and 10-H; and intermediate switch nodes 10-B, 10-C, 10-E, 10-F, 10-G, 10-I and 10-J. The network 11 also includes two working connections 60 and 64 which are shown by the single dashed lines; and two protecting connections 62 and 66 that are shown by the solid lines. Thus, the working connections are formed by the switch nodes {10-A, 10-B, 10-C, 10-D}, {10-K, 10-J, 10-I, 10-H}; and the protecting connections are formed by the switch nodes {10-A, 10-E, 10-F, 10-G, 10-D}, and {10-K, 10-G, 10-F, 10-E, 10-H}.

In this example, the communication links 20 between switch nodes 10-E, 10-F and 10-G are shared by both protecting connections 62 and 66 and form a group of shared resources 70. The working connections 60 and 64, and the protecting connections 62 and 66 can be established by the switch nodes 10-A, 10-B, 10-C, 10-D, 10-E, 10-F, 10-G, 10-H, 10-I, 10-J, and 10-K using GMPLS protocols prior to any network failure.

Shared-mesh restoration, as used herein refers to a situation in which the operator(s) from the headend switch node 10-A and/or 10-K signal one or multiple protecting connections for a particular working connection. Each protecting connection reserves the timeslots on the intermediate switch nodes 10-B, 10-C, 10-E, 10-F, 10-G, 10-I and/or 10-J, but does not actually configure them. The timeslots may be shared by multiple protecting connections. Upon network failure, the headend switch node 10-A and/or 10-K triggers explicit activation messages to activate one of the protecting connections 62 and 66. The intermediate switch nodes 10-E, 10-F and/or 10-G will configure the timeslots, and the headend switch node 10-A and/or 10-K will switch the user traffic over to the new working connection preferably immediately after transmission of the activation messages and before receiving acknowledgements that the protecting connections 62 and 66 have been activated. In general, each protecting connection is likely established over a set of switch nodes 10 and/or 10a that are shared by multiple other working and/or protecting connections.

Upon the detection of a working connection failure, the headend switch nodes, 10-A and/or 10-K or the tailend switch nodes 10-D and/or 10-H may trigger the activation messages to activate the protecting connections 62 and/or 66 and redirect user traffic onto the protecting connections 62 and/or 66 immediately thereafter.

The GMPLs protocols establish a consistent definition of priority levels among the connections throughout the network. The priority levels are used to activate and/or preempt certain of the protecting connections when the switch nodes 10-A, 10-B, 10-C, 10-D, 10-E, 10-F, 10-G, 10-H, 10-I, 10-J, and 10-K are processing the activation messages.

Preemption as referred to herein is a reallocation of network resources where timeslots of an intermediate switch node 10-B, 10-C, 10-E, 10-F, 10-G, 10-I and 10-J can no longer participate in an existing protecting connection. However, during preemption, if one of the switch nodes 10-E, 10-F, or 10G can find spare resources (e.g., time slots in a time-division multiplexing switching system), the switch node 10-E, 10-F, or 10G may accept an activation request and re-negotiate with the neighboring nodes with the newly allocated resources. This process is called "local resource reallocation".

When the protecting connection 62 is preempted on one of the intermediate switch nodes 10-E, 10-F, and/or 10-G, the intermediate switch node 10-E, 10-F, and/or 10-G, is responsible for notifying the headend switch node 10-A or 10-K and the tailend switch node 10-D or 10-H on protecting connection changes immediately, and interfacing with the control plane running on the exchange control module 30 to confirm resource changes.

As soon as the headend switch nodes 10-A and/or 10-K detect connection preemption on a particular intermediate switch node 10-E, 10-F, and/or 10-G, the headend switch nodes 10-A and/or 10-K inform all relevant intermediate switch nodes 10-E, 10-F, and/or 10-G, in the protecting connection 62 or 66 to free the resources.

In the network 11, the protecting connection 66 has higher priority than a priority of protecting connection 62. Initially, the switch node 10-A detects network failure on the communication link 20b between switch nodes 10-B and 10-C. Switch node 10-A then transmits activation messages to the switch nodes 10-E, 10-F, 10-G and 10-D, and then switches traffic to the protecting connection 62. Then, a failure on communication link 20j triggers the switch node 10-K to activate the protecting connect connection 66 by sending control messages through the control plane along the path including switch nodes 10-G, 10-F, 10-E, and 10-H. At switch node 10-G, switch node 10-K's activation messages will preempt the existing protecting connection 62, and may start to transmit data traffic prior to the preemption of switch node 10-F and switch node 10-E. For example, to avoid delay time, switch node 10-K may not wait for an end-to-end acknowledgement from the switch nodes 10-G, 10-F, 10-E, and 10-H before switch node 10-K begins transmitting data traffic.

To prevent misconnections, a unique identification is provided on outgoing data for each connection by the transport interface modules 50, 52, 54 and/or 56 in a transmit direction, and/or by one or more of the output interfaces 14. Through configuration or signaling, the intermediate switch nodes 10-E, 10-F and 10-G keep track of the unique identification for the connection and reject traffic with a unique identification that does not match the unique identification for the connection in the intermediate switch nodes 10-E, 10-F and 10-G.

FIG. 5 illustrates an example in which the user traffic is switched on different time slots at each hop by the switch nodes 10-E, 10-F and 10-G within the network 11. Initially, the protecting connection 62 uses two time slots which are identified in connection tables 71, 72, 74 and 76 with the notation "green".

The switch nodes 10-A and 10-E reserve two slots, i.e., timeslots $T_1$ and $T_3$ for communicating user traffic on the protecting connections 62 via the communication link 20g.

The switch nodes 10-E and 10-F reserve two slots, i.e., timeslots $T_0$ and $T_4$ for communicating user traffic on the protecting connections 62 and 66 via the communication link 20f.

The switch nodes 10-F and 10-G reserve two slots, i.e., timeslots $T_2$ and $T_3$ for communicating user traffic on the protecting connections 62 and 66 via the communication link 20e.

The switch nodes 10-G and 10-D reserve two slots, i.e., timeslots $T_2$ and $T_3$ for communicating user traffic on the protecting connections 62 via the communication link 20d.

The switch nodes 10-G and 10-K reserve two slots, i.e., timeslots $T_1$ and $T_3$ for communicating user traffic on the protecting connections 66 via the communication link 20l.

At each hop, the switch 18 (or switch fabric module 34) assigns the unique identification to each protecting connection 62 or 66 and the output interface 14 transmits the traffic with the unique identification (also referred to herein as a first identification) in the frame overhead 19c of the TDM frame 19a. When the input interface 12 receives the TDM frame 19a, the input interface 12 verifies that the first identification within the frame overhead 19c matches the unique identification as the protecting connection 62 and/or 66 carried by the switch nodes 10-E, 10-F, and 10G. If there is a mismatch, data traffic is rejected.

As shown in FIG. 5, due to network failure, switch node 10-K is switching user traffic over to the protecting connection 66, while sending activation messages to switch nodes 10-E, 10-F, and 10-G to initiate preemption and switch the timeslots initially labeled with the notation "green" to the notation "orange" as shown in connection tables 78 and 80. As shown in connection table 78, the preemption was successful on switch node 10-G but not on switch node 10-F prior to the switch node 10-K switching user traffic to the protecting connection 66. Because the preemption was successful on switch node 10-G, switch node 10-G contains the unique identification for the protecting connection 66, i.e. the timeslots $T_2$ and $T_3$ have been labeled "orange". As the TDM frame 19a arrives on switch node 10-G, the input interface 12 of the switch node 10-G will inspect the timeslots $T_2$ and $T_3$ to verify that the first identification within the frame overhead 19c is the same as the unique identification for the protecting connection 66. If the first identification matches the label of the timeslots $T_2$ and $T_3$, for example, the user traffic is not rejected and passed to the output interface 14 via the switch 18. The output interface 14 generates another TDM frame 19a having another user payload field 19b containing the user data, and another frame overhead field 19c containing a unique identification, e.g., "orange", and then transmits the TDM frame 19a to the switch node 10-F via the communication link 20e.

However, in the illustration, switch node 10-F was not successfully preempted. The connection table 72 of the switch node 10-F still contains the unique identification for the protecting connection 62, i.e. "green" reserved for the timeslots $T_0$ and $T_4$. The input interface 12 of the switch node 10-F compares the unique identification "orange" in the frame overhead 19c to the unique identification in the connection table 72, i.e., "green", determines that there is a mismatch, and rejects the TDM frame 19a.

At rejection, switch node 10-F may also transmit a maintenance signal to the switch node 10-K by replacing user traffic carried in the user payload field 19b with the maintenance signal, for example, an Alarm Indication Signal (AIS). The end node K, upon seeing the maintenance signal, such as the AIS, may then raise a management visible alarm, which would be a first indication of pre-emption or failure in the network. This squelching mechanism avoids sending node A's data traffic to node K during preemption.

The unique identification of the connection may be embodied in various ways. One option is a global identification in which the unique identification for the connection is encoded into the frame overhead 19c of the TDM frame 19a as discussed above. Instead of using notations such as "green" or "orange" as discussed above, a global identification may use the connection identification information as specified in RSVP SESSION and SENDER_TEMPLATE objects, which would result in a 12-byte address.

A local identification, rather than a global identification, is another option for implementing the identification of the protecting connections 62 and 66. This can be accomplished by assigning each protecting connection 62 or 66 with a plurality of identifications with each identification being unique on one of the communication links 20a-1. In this implementation, one of the switch nodes 10-E, 10-F or 10-G, for example, will only accept the user traffic with the proper local identification. For a given protecting connection, such as the protecting connection 62 or 66, each communication link, such as communication links 20f and 20e may have different local identifications. For example, the local identification may use a 20-bit MPLS label defined in IETF.

The global or local identifications discussed herein may be implemented in a variety of manners and the notations provided herein are only by way of example.

Figure 7:
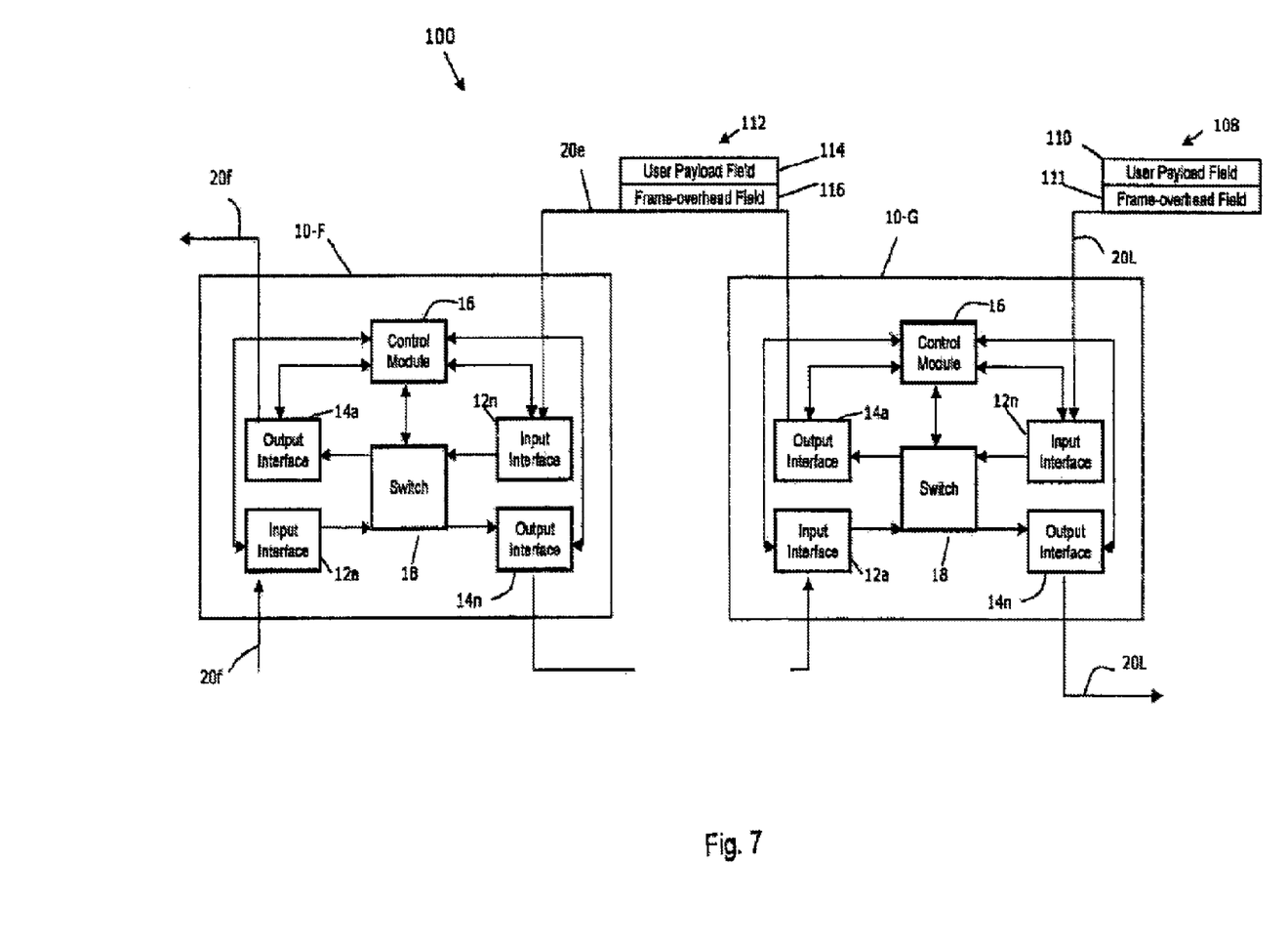
FIG. 7 is a block diagram of an exemplary system for misconnection avoidance in the network.

Referring now to FIG. 7, shown therein for purposes of clarity is a more detailed view of the switch nodes 10-F and 10-G interconnected by communication links 20f, and 20e which forms one example of a system 100 for misconnection avoidance on the network 11 having a first connection (protecting connection 62) being a first path in the network 11, and a second connection (protecting connection 66) being a second path in the network 11. The system 100 is provided with a first communication link (i.e., the communication link 20l); and a second communication link (i.e., the communication link 20e). The input interface 12n of the switch node 10-G is coupled to the first communication link 20l and receives a first TDM frame 108 which is constructed similar to the TDM frame 19a, and has a user payload field 110 containing a first user data from the first communication link 20l. The switch node 10-G also has the output interface 14a coupled to the second communication link 20e. The output interface 14a receives the first user data via the switch 18 and generates a second TDM frame 112 having a user payload field 114 containing the first user data, and a frame overhead field 116 containing the first identification in the global identification embodiment discussed above, or a second identification different from the first identification in the local identification embodiment discussed above.

The switch node 10-F has the input interface 12n coupled to the second communication link 20e and receives the second TDM frame 112. The input interface 12n of the switch node 10-F is configured to validate the first identification in the frame overhead field 116 and reject the first TDM frame 112 responsive to the first identification being invalid, as discussed above.

The first identification can identify the first connection (e.g., the first protecting connection 62) and can be unique throughout the network 11. In other words, the first identification can identify resources of the first connection (e.g., the protecting connection 62), and the input interface 12n of the switch node 10-F may determine that the first identification is invalid responsive to the resources identified by the first identification being configured as part of the second connection (e.g., the protecting connection 66).

CONCLUSION

Thus, it will be appreciated that in a network 11 where an operator allocates a common set of network resources to protect multiple working connections, there was not a known mechanism that can activate protecting connections in a timely fashion and prevent misconnection to unintended end users. The presently disclosed and claimed inventive concepts provide a system and method for avoiding misconnection on networks by use of unique identification of the connection while also enhancing the activation of protecting connections by transmitting data to the protecting connection before receipt of an acknowledgement indicating that the protecting connection has been activated.

The network 11 can be of various types and utilize various protocols. For example, the network 11 can be an Integrated Services Digital Network (ISDN), or a Public Switched Telephone Network (PSTN), Optical Transport Network (OTN), a Synchronous Optical Network (SONET), or a Synchronous Digital Hierarchy (SDH) network. An exemplary protocol for transferring user traffic can be an Asynchronous Transfer Mode (ATM). ATM is a frame based communication protocol in which all of the data transmitted in the network 11 are broken up into TDM frames 19a. The TDM frame 19a can be 53 bytes of which 5-bytes (40 bits) forms the frame overhead 19c, and 48-bytes forms the user payload field 19b. The source and destination of the TDM frame 19a is normally not identified in the frame overhead 19c. Instead the frame overhead 19c contains an identifier whose context is only defined along a single link, not end-to-end between source and destination. The frame overhead 19c can also contain a 12 bit virtual path indicator (VPI), a 16-bit virtual channel indicator (VCI) that assigns the TDM frame 19a to a specific virtual dataflow along a physical communication link between two switch nodes, such as the switch nodes 10-E and 10-F. In accordance with this disclosure, the first identification is also included in the frame overhead 19c and can be equal to or less than 12 bits to conform to the ATM protocol.

The foregoing description provides illustration and description, but is not intended to be exhaustive or to limit the disclosure to the precise form disclosed. Modifications and variations are possible in light of the above teachings or may be acquired from practice of the disclosure.

For example, while a series of blocks or nodes have been described with regard to FIGS. 4 and 5 the order of the blocks may be modified in other implementations. Further, non-dependent blocks may be performed in parallel.

Also, certain portions of the implementations have been described as "components" that perform one or more functions. The term "component," may include circuits including hardware, such as a processor, an application specific integrated circuit (ASIC), or a field programmable gate array (FPGA), or a combination of hardware and software.

Further, while implementations have been described in the context of an optical network, this need not be the case. These implementations may apply to any form of circuit-switching network or hybrid circuit switched/packet switched network.

Even though particular combinations of features are recited in the claims and/or disclosed in the specification, these combinations are not intended to be limiting. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A network, comprising:
a first communication link, the first communication link including a plurality of protecting connections;
a second communication link;
a first switch node having a first input interface coupled to the first communication link an output interface coupled to the second communication link, the first input interface receiving a first TDM frame having a first priority and a first user payload field including a first user data and a frame overhead field including a first identification from the first communication link, the first identification identifying one of the plurality of protecting connections, the first input interface configured to validate the first identification, and pass the first user data to the output interface responsive to the first identification being valid, the output interface receiving the first user data and generating a second TDM frame having a second user payload field including the first user data, and a second frame overhead field including a second identification with the second identification being different from the first identification, the first switch node having a second input interface that receives a second TDM frame, the second TDM frame having a second priority, the first priority being higher than the second priority, the first TDM frame being rejected at the first interface unless the first identification is valid and the first switch node is configured to preempt the second TDM frame, the frame overhead field of the first TDM frame not including a source and not including a destination of the first TDM frame;
a second switch node having a third input interface coupled to the second communication link and receiving the second TDM frame, the third input interface configured to validate the second identification and reject the second TDM frame responsive to the second identification being invalid; and
a headend switch node coupled to the second switch node, the headend node supplying user traffic to the second switch node, such that the user traffic is carried by said one of the plurality of protecting connections, the headend node supplying the user traffic to the second switch node prior to receiving an acknowledgement from the second switch node that said one of the plurality of protection connections has been activated.

2. The network of claim 1 wherein the first and second switch nodes are configured to communicate in a connection based optical network, and wherein the first and second communication links are optical links.

3. The network of claim 1 wherein the second input interface is configured to reject the second TDM frame when the second identification does not match a third identification.

4. The network of claim 1, wherein the input interface of the second switch node is an ingress line module and wherein the output interface of the first switch node is an egress line module.

5. The network of claim 1, wherein the first and second identifications identify reserved time slots of a particular connection defined by the first and second communication links and the first and second switch nodes.

6. The network of claim 1, wherein the first switch node outputs a notification responsive to the first identification being invalid.

7. The network of claim 1, wherein the first and second switch nodes communicate using time division multiplexing protocols defining reserved wavelengths, and wherein the first identification identifies one or more reserved timeslots, and wherein the first input interface is defined further as the first input interface comparing the first identification to information indicative of one or more reserved time slots and rejecting the first TDM frame responsive to a mismatch.

8. The network of claim 1, wherein the first identification includes an MPLS label.

9. The network of claim 1, wherein the first and second switch nodes are configured to communicate as a circuit switched network.

10. The network of claim 1, wherein the first switch node establishes the plurality of protecting connections and a plurality of working connections in accordance with a Generalized Multi-Protocol Level Switching protocol.

11. The network of claim 1, wherein shared mesh network.

12. A method, comprising the steps of:
receiving, by circuitry of an input interface of a switch node of a network having a first connection being a first path in the network, the first connection being one of a plurality of protecting connections, a first TDM frame carrying user data and having a first priority containing an identification in a frame overhead field of the first TDM frame from the first connection, the identification identifying said one of the plurality of protecting connections;
determining, by circuitry of the input interface, whether the identification is indicative of predetermined reserved timeslots;
rejecting at the input interface of the switch node the first TDM frame responsive to the identification contained in the frame overhead field not matching the predetermined reserved timeslots, the frame overhead field of the first TDM frame not including a source and not including a destination of the first TDM frame;
receiving a second TDM frame having a second priority, the first priority being higher than the second priority; and passing the user data if the identification matches the predetermined reserved timeslots and the switch node is configured to preempt the second TDM frame, such that the user data is passed prior to a headend node receiving an acknowledgement that the first connection has been activated.

13. The method of claim 12, wherein the network is a connection based optical network.

14. The method of claim 12, wherein the first identification includes a MPLS label.

15. The method of claim 12, wherein the input interface includes an ingress line module.

16. The method of claim 12, further including establishing the plurality of protecting connections and a plurality of working connections in accordance with a Generalized Multi-Protocol Level Switching protocol.

17. A network comprising:
a switch node, comprising:
 a switch;
 a first input interface for coupling to a first communication link to receive a first TDM frame having a first priority user payload field containing a first user data from the first communication link, and a frame overhead field containing a first identification, the first communication link being one of a plurality of protecting connections and the first identification identifying said one of the plurality of protecting connections, a second interface that receives a second TDM frame having a second priority, the first priority being higher than the second priority, the switch forwarding the user data when the first identification is valid and the switch is configured to preempt the second TDM frame, the frame overhead field of the first TDM frame not including a source and not including a destination of the first TDM frame;
 an output interface for coupling to a second communication link, the output interface configured to receive the first user data from the switch, and generate a third TDM frame having a second user payload field containing the first user data, and a second frame overhead field containing a second identification that is different from the first identification, and configured to transmit the third TDM frame onto the second communication link, the second frame overhead field not including a source and not including a destination of the second frame; and
 a headend switch node coupled to the switch, the headend node receiving the first user data prior to receiving an acknowledgement from the switch that said the first communication link has been activated.

18. The switch node of claim 17, wherein the first identification identifies resources of a first connection, and the input interface of the switch node determines that the first identification is invalid responsive to the resources identified by the first identification being configured as part of a second connection.

19. The switch node of claim 18, wherein the resources include one or more reserved time slots.

20. The switch node of claim 17, wherein the switch node establishes the plurality of protecting connections and a plurality of working connections in accordance with a Generalized Multi-Protocol Level Switching protocol.

* * * * *